United States Patent [19]

Beauchesne

[11] Patent Number: 5,038,986
[45] Date of Patent: Aug. 13, 1991

[54] COUPON ORGANIZER

[76] Inventor: Dorothy A. Beauchesne, 3521 Erie Ct., Orlando, Fla. 32810

[21] Appl. No.: 497,706

[22] Filed: Mar. 23, 1990

[51] Int. Cl.⁵ .......................... B60R 7/00; B65D 69/00
[52] U.S. Cl. ............................... 224/277; 224/42.46 R; 206/232
[58] Field of Search ......... 224/277, 42.46 R, 42.46 B; 280/33.992; 206/232, 831, 38

[56] References Cited

U.S. PATENT DOCUMENTS

| | | | |
|---|---|---|---|
| 1,160,818 | 11/1915 | Barlow | 206/232 |
| 4,004,690 | 1/1977 | Giarritta | 206/425 |
| 4,312,393 | 1/1982 | Green | 206/425 |
| 4,512,504 | 4/1985 | Owlett | 224/42.46 R |
| 4,650,103 | 3/1987 | Mitchell | 224/277 |
| 4,722,464 | 2/1988 | Wright | 224/235 |

*Primary Examiner*—Henry J. Recla
*Assistant Examiner*—David J. Walczak
*Attorney, Agent, or Firm*—Edward M. Livingston

[57] ABSTRACT

A shopping coupon organizer, having plurality of coupon pockets arranged in columns and rows which can be attached to the handle of a shopping cart or child safety seat. Each coupon pocket has a slit at the top of the insertion of a coupon with a flap that folds over said slit to secure the coupons in the pocket. Fastening means, such as hook-and-loop fastening material or snaps may be used to attach the top of the organizer to the shopping cart handle. Each pocket can be labeled according to a shopper's desires for easy organization of coupons and even further subdivided by index cards. This coupon organizer can be rolled into a tube or folded along vertical and horizontal lines between the pockets to form a bundle or stack that can be carried easily. An elastic strap attached to the organizer can then be wrapped around the stack for easy carrying to and from shopping.

9 Claims, 1 Drawing Sheet

COUPON ORGANIZER

BACKGROUND OF THE INVENTION

This invention relates to an organizer and more particularly a one-piece foldable organizer primarily for storing and indexing coupons, which is attachable to a shopping cart while shopping, but which also may be used for storing and indexing other items such as credit cards, checks, etc.

The use of coupons to obtain discounts on products, particularly for groceries, is quite common. Coupons are received from a wide variety of sources for a wide diversity of packaged products, those sources including the mail, newspapers and at the point of purchase in the store and on the product itself. Due to the wide diversity of coupons for many brands of products, the consumer finds it very difficult and nearly impossible to organize these coupons in a manner for quick and easy use while shopping.

Currently on the market are purse-like holders and index boxes with labeled divider cards to assist the consumer in the task of separating and storing the coupons in an easy-to-use fashion. The problem with such holders and boxes is that one cannot readily see the coupons while shopping and must look through many coupons to obtain the desired one. Furthermore, such items are not attachable to the shopping cart or adequately secured in the holder and are thus subject to being spilled by the consumer or by a child in the shopping cart safety seat. Thus, there is a need for a coupon organizer that can be used to organize, store, secure and retrieve coupons easily while shopping.

The prior patented art includes numerous coupon organizers, but none like the present invention. U.S. Pat. No. 4,512,504 by Owlett (1985) is the only prior patented device which attaches to a shopping cart. However, although the Owlett device is more convenient than some prior devices in that it attaches to the shopping cart, it provides no other advantage over purse-like organizers on the market since it only has one coupon compartment. The remaining prior art includes coupon organizers that do not attach to shopping cart handles and vary from purse-like, box-like or even suitcase-like coupon organizer and include U.S. Pat. No. 4,237,947 by Mater (1980); U.S. Pat. No. 4,312,393 by Green (1982); U.S. Pat. No. 4,260,055 by Slaybaugh (1981); U.S. Pat. No. 4,004,690 by Giarritta (1977); U.S. Pat. No. 4,802,575 by Martin (1989); U.S. Pat. No. 4,450,994 by Holland (1984); and U.S. Pat. No. 4,591,054 by Blossom (1986).

Unfortunately, none of the prior patented art allows the coupons to be separated into a multiplicity of compartments for easy use while shopping.

SUMMARY OF THE INVENTION

The primary object of the present invention is to provide a device to help organize coupons.

A second object of the present invention is to provide a device that can also be used to store coupons.

A further object of the present invention is to provide such a coupon organizer that is attachable to a shopping cart.

An even further object of the present invention is to provide a coupon organizer that will prevent the coupons from being spilled during shopping, particularly by a young child riding in the shopping cart.

An additional object of the present invention is to provide such a coupon organizer in which the compartments can be labeled according to the shoppers desire.

Another object of the present invention is to provide such a coupon organizer that is foldable so that it may be easily carried.

The present invention fulfills the above and other objects by providing a coupon organizer that comprises two layers of resilient material attached to each other around the periphery thereof and at intervals throughout to form a plurality of compartments or pockets arranged in one or more columns and rows, each pocket having a slit at the top thereof for insertion of coupons. At the top of the organizer is an extension formed by the front and back layers being attached together. This extension has two separate rows of fastening means, such as hook-and-loop fastening material like Velcro (R), or snaps so that the top extension can be wrapped around the handle of the shopping cart and secured thereto. Each coupon pocket has a flap that folds down over the top slit thereof to prevent the coupons from being spilled or coming out while shopping. Each flap has securing means such as hook-and-loop fastening like Velcro (R) or snaps to firmly secure the flap to the front of the pocket. Each compartment may be labeled and subdivided by index cards according to the type of product in alphabetical order if desired, such as, for example, Aspirin, Baby Supplies (such as diapers and baby food), Cereal, etc. Finally, for easy carrying when not in use to and from shopping, this coupon organizer may be folded along the vertical bonding lines between the pockets and then along the horizontal bonding lines at the top and bottom of each pocket to result in a bundle having a width and length no larger than approximately two of the coupon pockets. The fastening means may comprise an elastic band attached to the extension at the top of the organizer which can then be wrapped around the organizer to keep it in the folded carrying position.

The above objects will become more readily apparent when a preferred embodiment of the invention is described as illustrated in the drawings.

BRIEF DESCRIPTION OF THE DRAWINGS

The drawings used in conjunction with describing a preferred embodiment of the invention are as follows.

DESCRIPTION OF THE PREFERRED EMBODIMENTS

Figure 1:
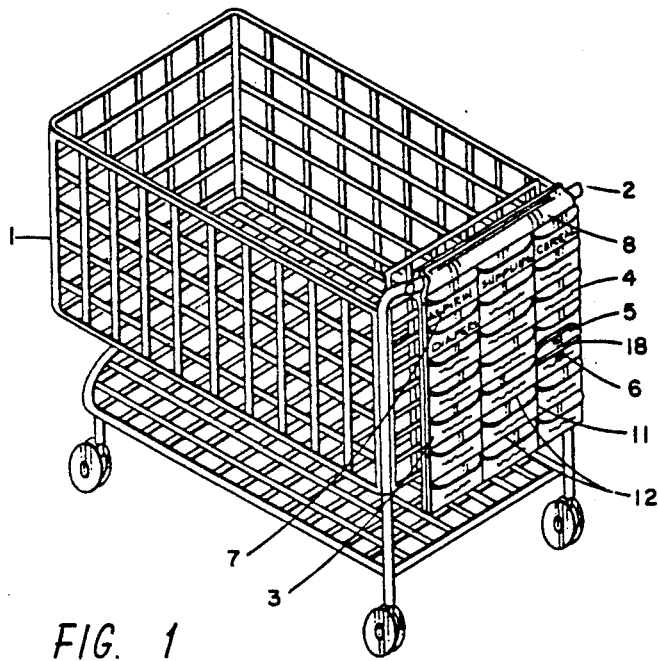
FIG. 1 is a perspective view of the coupon organizer attached to the shopping cart handle.

With reference to the drawings, the coupon organizer depicted generally as 3 in FIG. I is shown attached to the handle 2 of the shopping cart 1. As shown, the coupon organizer 3 hangs vertically downward from the shopping cart handle 2 in a manner that can be easily reached and used by the shopper, but cannot be easily reached by a child riding in the shopping cart. The coupon organizer 3 contains preferably a plurality of columns of coupon pockets 4 which are sufficiently large to comfortably hold coupons and yet not be so wide that it does not fit easily onto a shopping cart handle. Each pocket 4 has a flap 5 which folds over the open top slit 18 of the pocket. The flap 5 may be secured to the front of each coupon pocket 4 in the closed position by fastening means 6 which may consist of hook-and-loop fastening material such as Velcro (R) or snaps. Each pocket 4 may contain a label 7 depicting a title according to the shopper's desires, which may be by the type of product such as aspirin, baby supplies, cereal, etc., preferably arrayed in alphabetical order for easy retrieval of the coupons.

Figure 2:
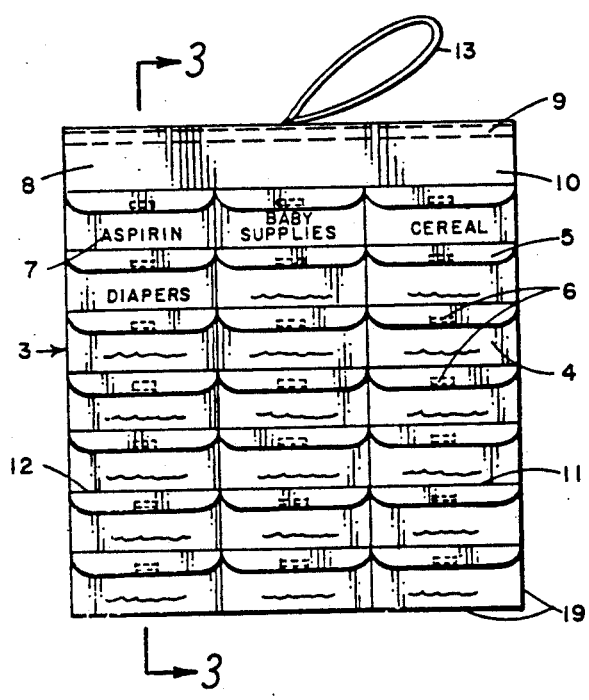
FIG. 2 is a front plan view of the coupon organizer by itself.

In FIG. 2 additional features of the coupon organizer 3 are illustrated better. These additional features include the top extension 8 which folds over and around the shopping cart handle 2 and is fastened thereto by two rows of fastening material 9, both at the top of the extension 8 which may consist of hook-and-loop fastening material or snaps. The extension 8 consists of two separate layers which may be open to the bottom 10. As shown in FIG. 2, the organizer also contains an elastic strap 13 attached thereto which can be folded into the extension 8 when it is placed on the shopping cart so that a child cannot reach it.

Figure 3:
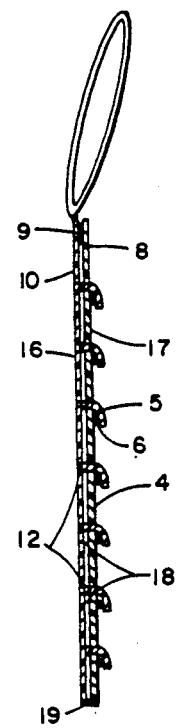
FIG. 3 is a side cross-sectioned view of the coupon organizer along lines 3—3 of FIG. 2.

The view of FIG. 3 shows a cross-sectional view along lines 3—3 of FIG. 2. The back and front layers, 16 and 17, respectively, of the coupon organizer are secured together along the periphery 19 on the bottom and sides thereof and also at the top extension 8. The top extension may be secured together to form one solid piece rather than open pockets as in the remainder of the organizer. In addition, the two layers are bundled along vertical lines 11 and horizontal lines 12 between the pockets 4.

Figure 4:
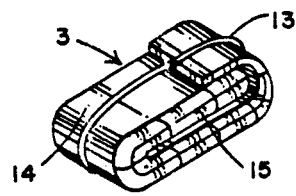
FIG. 4 is perspective view of the coupon organizer in the folded position for carrying.

When shopping is completed, the coupon organizer 3 may be rolled into a tubular formation, or preferably folded along the vertical column divider lines 11 and horizontal row divider lines 12 to form a bundle 15 as shown in FIG. 4. This bundle will be of a width and length no greater than two coupon pockets. The elastic strap 13 could then be secured around the bundle to keep it in the folded position. In this manner, the coupon organizer could be carried easily under one's arm.

Although the coupon organizer could be made from almost any flexible material such as cloth or plastic, it would preferably be made of transparent plastic, especially the front layer 17, so that a shopper could easily see coupons through the front layer 17. By using plastic, the organizer could be easily heat bonded or sewn around its perimeter 19 and along the vertical lines 11 and the horizontal lines 12 between the pockets to reduce manufacturing of the organizer.

The present invention facilitates the organizing, storage and retrieval of coupons in many ways. Prior to shopping, the coupons can be quickly and easily separated into the many coupon pockets. Although the number of coupon pockets may vary depending on the size of the coupons, preferably the organizer would have up to twenty-one (21) compartments, arranged in three columns and seven rows, and still fit comfortably on the handle of a standard shopping cart. The coupons in each pocket can be organized so the most preferred or desired coupon is in the front of the pocket so as to be easily seen therethrough. The coupons could even be arranged by expiration date as well so those coupons with the earliest expiration dates would be in front so such are used first. The coupons in the pocket could also be subdivided by index cards. Once at the grocery store, whenever a coupon is desired it could be easily retrieved merely by opening the flap and pulling the coupon through the top slit in each pocket. When shopping is completed, the organizer may be easily and quickly folded along bonded fold lines into a which can be easily carried by hand to and from shopping.

Thus, it should be apparent that a new and non-obvious device for organizing, storing and retrieving coupons has been provided by the present invention which would make any coupon user's shopping trips easier and more fruitful than what is currently the case.

Although one preferred embodiment of the device has been shown in the drawings and discussed in detail, modifications and changes thereto which may be incorporated, are intended to be within the spirit and scope of the claims appended hereto.

Having thus described my invention, I claim:

1. An organizer for separating, collecting and storing coupons and the like and adapted to be removably secured to a portable apparatus having a horizontally disposed tubular handle comprising:
   a back layer of resilient material;
   a front layer of resilient material attached to said back layer around the opposite sides and lower peripheral edge of said layers;
   a plurality of compartments arranged in one or more columns and rows formed by the attachment of the front layer to the back layer at the bottom and sides of each compartment, wherein the front layer contains slits located at the top of each of said compartments, said front and back layers having upper edge portions;
   an extension formed at the top of the organizer by the upper edge portions of the front and back layers adapted to be wrapped around the handle; and
   means for removably attaching said upper edge portions together to secure said organizer to the handle.

2. The organizer of claim 1 wherein the means for attaching the organizer to the handle consists of matching hook-and-loop fastening material on the extension.

3. The organizer of claim 1 or 2 wherein each pocket has a flap which folds over the top slit of the pocket to secure the coupons in place, each of said flaps having means on the inside thereof for attaching each of the flaps in a closed position.

4. The organizer of claim 1 or 2 further comprising means for allowing folding of the organizer into a bundle.

5. The organizer of claim 4 wherein the means for allowing folding of the organizer consists of vertical and horizontal fold lines between the coupon compartments and extending through the top extension thereof so that the organizer can be folded along said lines.

6. The organizer of claim 5 having means for maintaining the organizer in a folded position as desired when it is not attached to the handle of a shopping cart or child safety seat.

7. The organizer of claim 6 wherein the means for maintaining the organizer in a folded position comprises an elastic strap attached to the organizer which can be wrapped around the folded organizer.

8. The organizer of claim 5 wherein the means for attaching the flaps comprises matching hook-and-loop fastening material on the inside of the flaps.

9. The organizer of claim 2 wherein the means for attaching the flaps to the front of the compartment consists of matching snaps.

* * * * *